(12) United States Patent
Chang

(10) Patent No.: US 7,407,128 B1
(45) Date of Patent: Aug. 5, 2008

(54) CORD REEL BOX

(76) Inventor: Hsi-Fan Chang, 8F-6, No. 18, Lane 609, Sec., 5, Chung Shin Road, Sanchung, Taipei (TW)

( * ) Notice: Subject to any disclaimer, the term of this patent is extended or adjusted under 35 U.S.C. 154(b) by 0 days.

(21) Appl. No.: 11/840,190

(22) Filed: Aug. 16, 2007

(51) Int. Cl.
*B65H 75/48* (2006.01)

(52) U.S. Cl. .................................................. 242/385.4

(58) Field of Classification Search ............... 242/378, 242/378.1, 378.2, 385, 385.4
See application file for complete search history.

(56) References Cited

U.S. PATENT DOCUMENTS

| | | | | |
|---|---|---|---|---|
| 2,306,611 A | * | 12/1942 | Benjamin | 242/385.4 |
| 5,920,997 A | * | 7/1999 | Girtman | 242/385.4 |
| 6,378,797 B1 | * | 4/2002 | Liao | 242/378.1 |
| 7,017,721 B1 | * | 3/2006 | Bradford et al. | 242/385 |
| 2004/0232267 A1 | * | 11/2004 | Liao | 242/378.1 |

* cited by examiner

*Primary Examiner*—William A Rivera
(74) *Attorney, Agent, or Firm*—Banger Shia

(57) ABSTRACT

A press cord reel box is comprised of an upper casing, a press spring, a push button, a revolving cylinder, a wiring material, and a lower casing characterized in that through changed location of a pivot for the push button to press and supporting the push button by the turning axle from the lower casing, the present invention effectively prevents the push button from collapsing after longer period of repeated press; and that the purpose of product quality assurance is achieve; and that a longer service life is provided; furthermore, all structural members are reasonably disposed in the present invention to achieve simple, compact, and smaller sized assembly to provide powerful utility.

5 Claims, 5 Drawing Sheets

*Priority Art*

CORD REEL BOX

BACKGROUND OF THE INVENTION (a) Field of the Invention

The present invention is related to a cord reel box, and more particularly to a press cord reel box one that receives cord of electronic product.

(b) Description of the Prior Art

Cord reel boxes are essentially provided to receive cord of electronic products, e.g., those popularly applied in connecting and locating a telephone set to a wiring box and in connecting a computer to its peripheral hardware facilities. Design of electronic product is heading for being lighter, thinner, shorter, and smaller thanks to rapid development of advanced technology. While demanding quality assurance, the manufacturing industry of cord reel box also has to consider convenient use of the cord reel box. How to reduce the size of the finished product of the cord reel box is an issue pending solutions challenging the manufacturers of cord reel boxes in meeting market demands.

Referring to FIG. 1 for an improved structure of a cord reel box disclosed in a Chinese Patent No. ZL200520060887.X, the reel is comprised of an upper casing 1' a lower casing 2' and a revolver 3' disposed at where between and covering up the upper casing 1' and the lower casing 2' a wiring material 4' is wound up on an upper surface of the revolver 3' a coil 5' providing elastic retraction is inserted to a bottom of the revolver 3' a through hole 6' is disposed at a center of the revolver 3' the through hole 6' is inserted onto a support 7' protruding in the lower casing 2' a hole 8' containing a spring 9' is provided in the support 7' the spring 9' rests on a push-button switch 10' the switch 10' is inserted through a hole disposed on the upper casing 1' and the support 7' penetrates through the coil 5' the through hole at the center of the revolver 3' in sequence to make a revolving mechanism. Accordingly, the purpose of winding up the cord is achieved by pressing the spring 9' below the switch 10' and the revolver 3' linked to the coil 9' However, The coil 0' is disposed in the support 7' protruding from a bottom in the lower case 2' When applying a force on the switch 10? one end of the switch 10' can only have the support 7' as a pivot while the other end of the switch has to remain always suspended in the upper casing 1' Consequently, the switch 7' is vulnerable to collapse after a longer period of operation to compromise the quality of the cord reel box; and indirectly suffers shorter service life to cause inconvenience in operation and trouble to the operator.

SUMMARY OF THE INVENTION

The primary purpose of the present invention is to provide an improved construction of a cord reel box to effectively correct the problem found with the prior art for having its switch to easily get collapsed; allow easier operation, achieve the purpose of product quality assurance, and extends service life of the product.

Another purpose of the present invention is to provide an improved construction of a cord reel box that is simple in structure, compact, and delivering powerful utility.

To achieve these purposes, a press cord reel box of the present invention is comprised of an upper casing disposed with a push-button hole, a U-shaped cantilever protruding from an inner wall of the upper casing with a primary arm of the cantilever laterally penetrating through the push-button hole, and a locating pillar being disposed on the primary arm in the direction of heading for the push-button hole; a press spring disposed by insertion to a locating pillar disposed on the upper casing; a push button comprised of a press portion and a locating portion protruding from the press portion, the press portion being inserted into the push button hole and having its bottom compressing upon a top of the press spring; a revolving cylinder having at its central disposed with an accommodation chamber to receive placement of a winding coil and at its top a recess for the locating portion from the push button to snap on; a wiring material winding upon a peripheral of the revolving cylinder; a lower casing, both of the lower casing and the upper case being interlocked to each other to constitute an accommodation chamber for placing the revolving cylinder and the wiring material, two cord outlets to expand and contract an end of the wiring material being jointly disposed on side walls respectively of the upper casing and the lower casing; and a turning axle protruding from an inner wall of the lower casing to penetrate through in sequence the coil and the revolving cylinder to rest on where below the locating portion of the push button.

The recess on the revolving cylinder has one sidewall inclined for a certain degree.

A partitioning board provided with a central axial hole is laterally disposed in the revolving cylinder to segregate the accommodation space into an upper accommodation space and a lower accommodation space with the coil being mounted in the lower accommodation space.

A locating tenon protrudes from a bottom of the press portion of the push button and is locked to the spring of the push button.

A trough to receive the locating portion of the push button is provided on an inner wall of the upper casing.

When compared to the prior art, the present invention provides advantages that the structural design of having changed the location of a pivot for the push button to press and supporting the push button by the turning axle from the lower casing effectively prevents the push button from collapsing after longer period of repeated press; and that the purpose of product quality assurance is achieve; and that a longer service life is provided. All structural members are reasonably disposed in the present invention to achieve simple, compact, and smaller sized assembly to provide powerful utility.

DETAILED DESCRIPTION OF THE PREFERRED EMBODIMENTS

Figure 1:
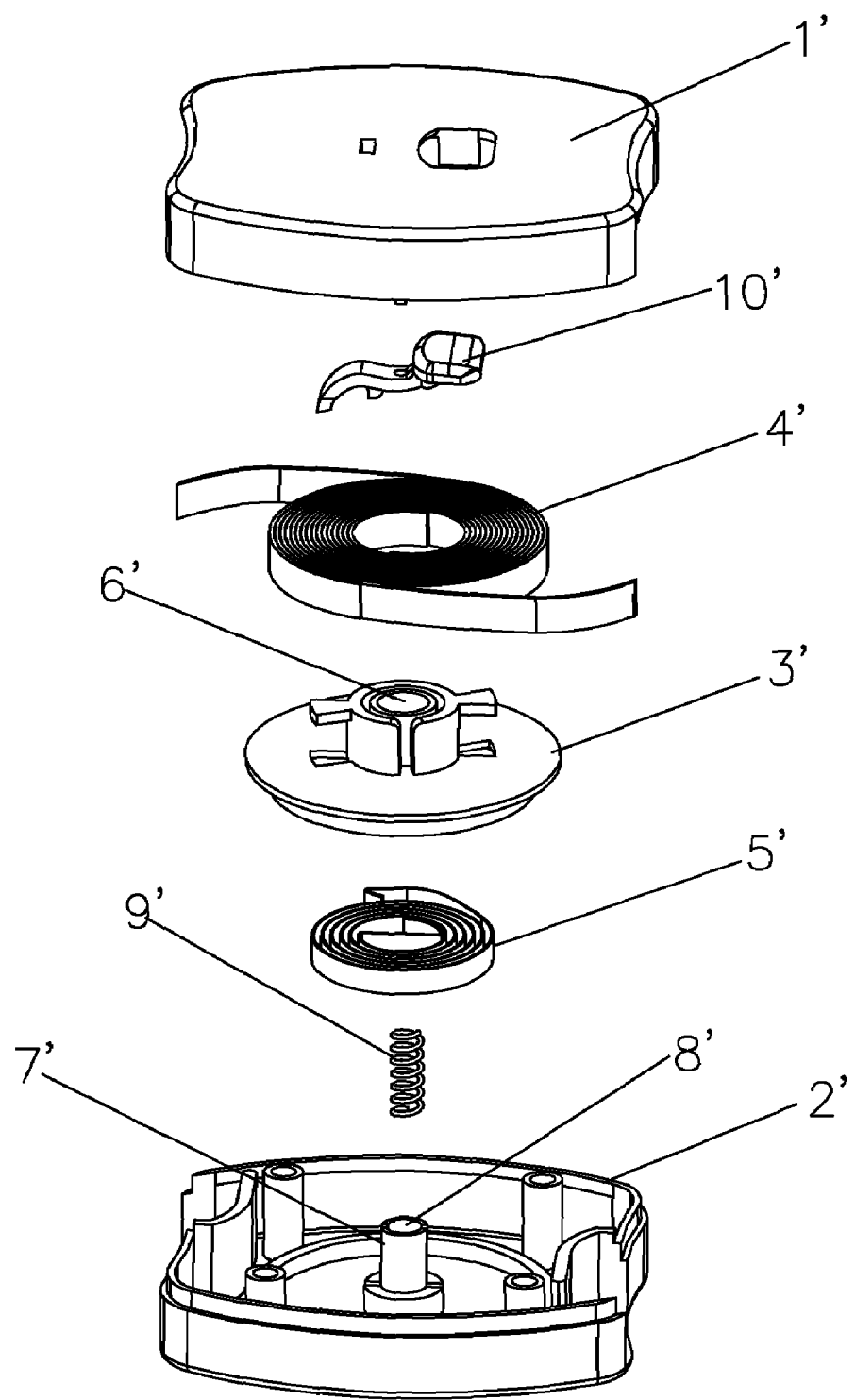
FIG. 1 is an exploded view of the prior art.
Figure 2:
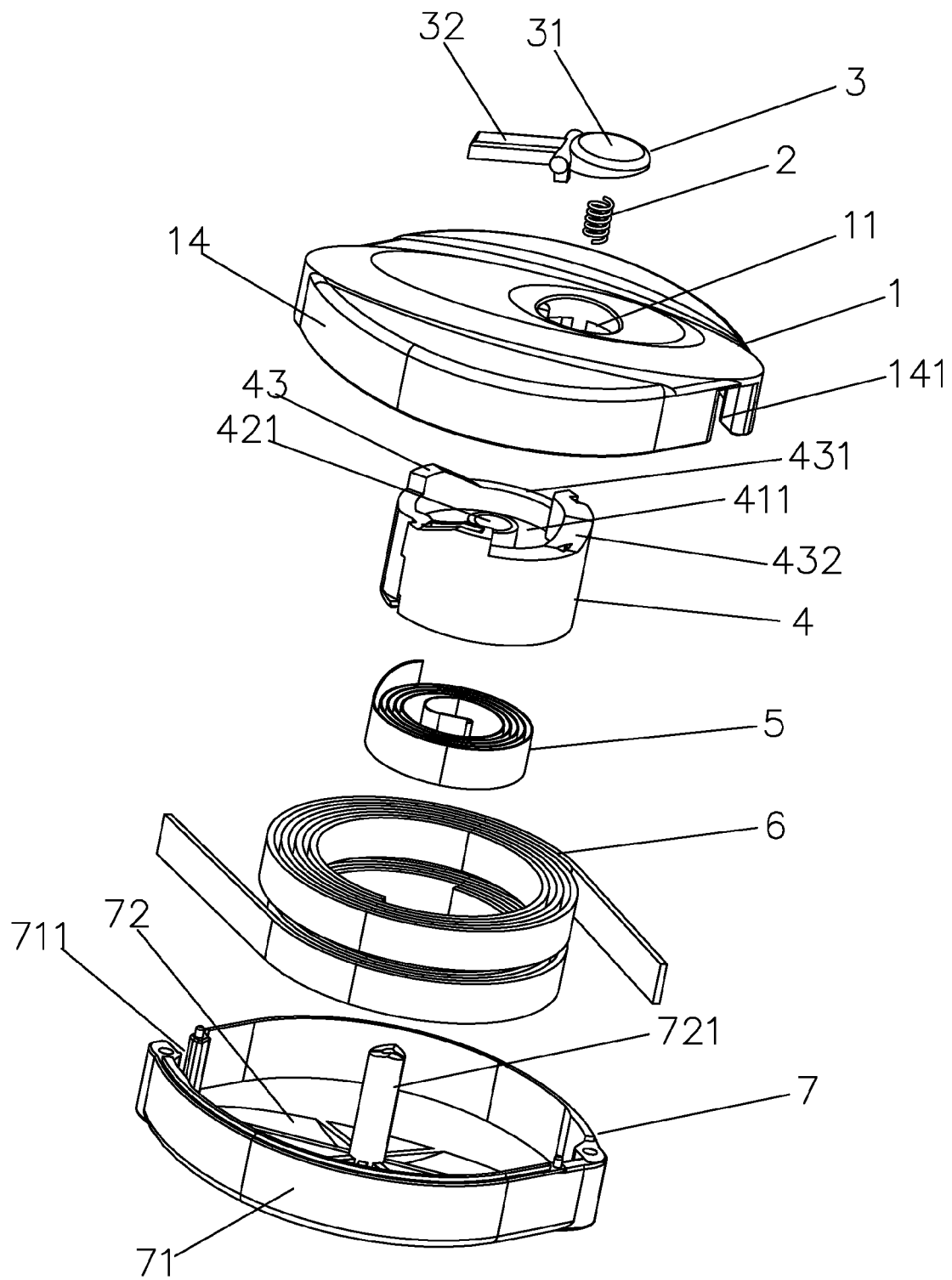
FIG. 2 is an exploded view of the present invention.
Figure 3:
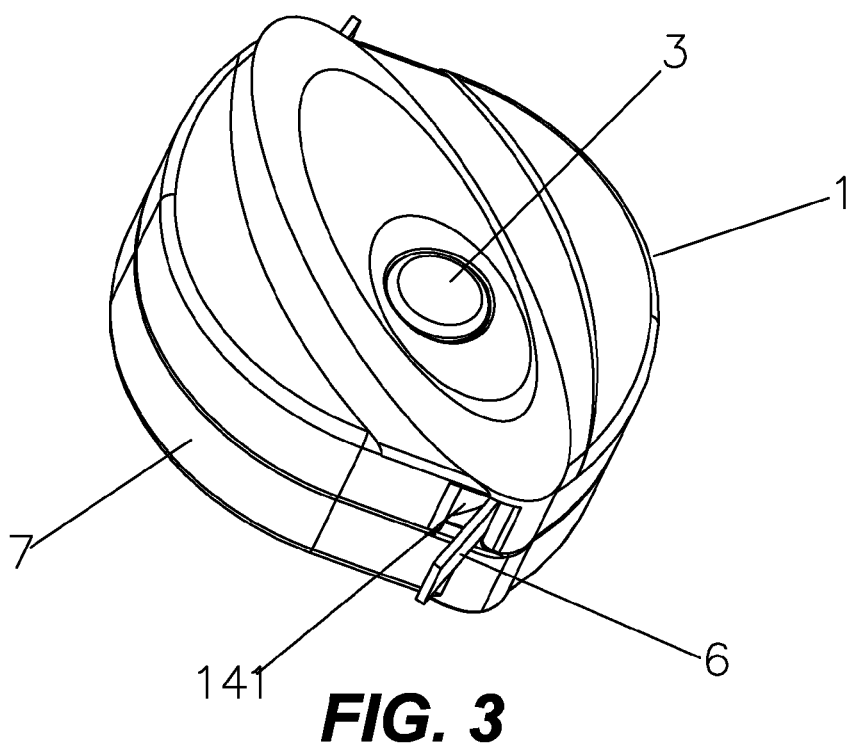
FIG. 3 is a schematic view showing the present invention as assembled.
Figure 4:
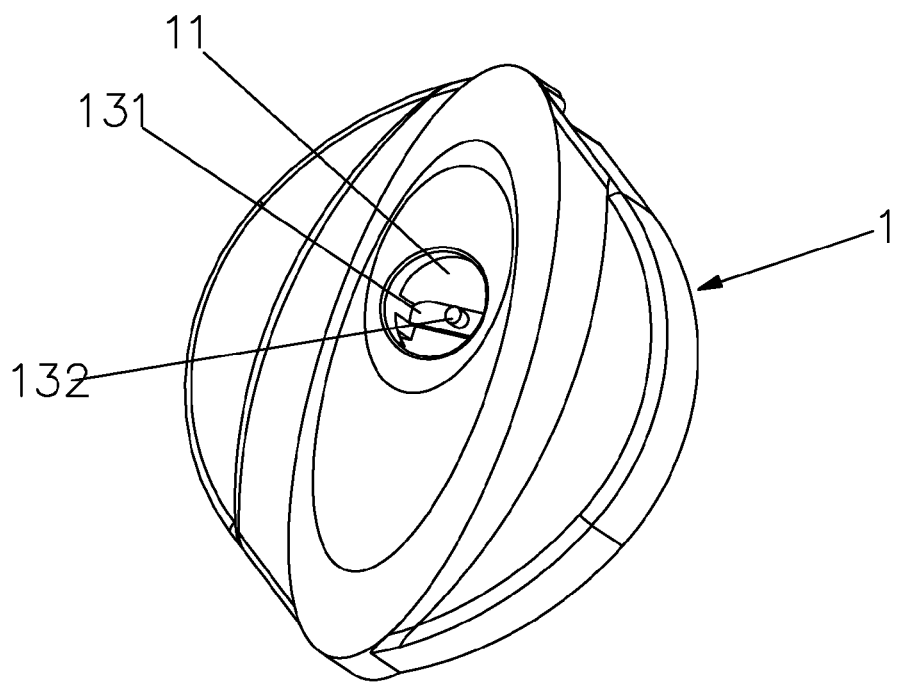
FIG. 4 is a schematic view showing an upper casing of the present invention.
Figure 5:
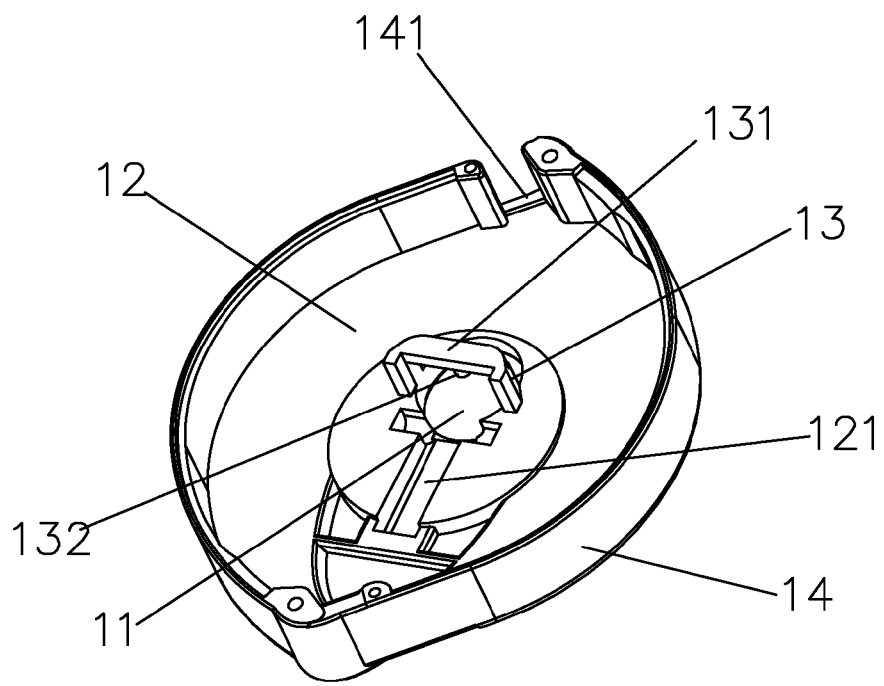
FIG. 5 is a schematic view showing a construction at another angle of view of the present invention taken from FIG. 4.
Figure 6:
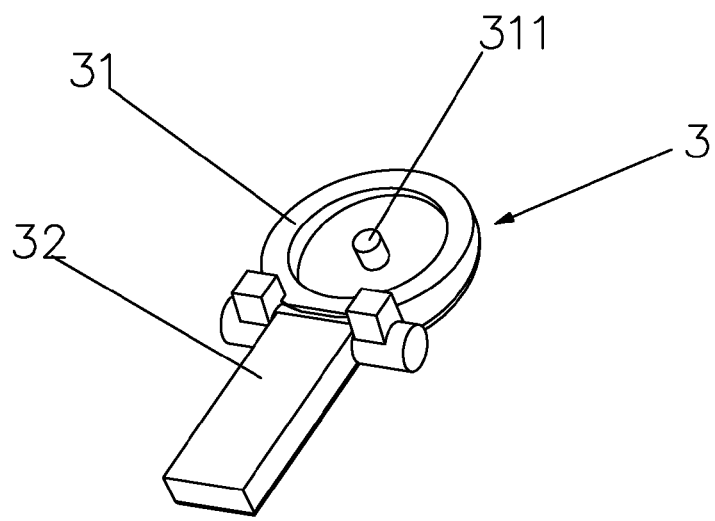
FIG. 6 is a magnified view of a push button in the present invention.
Figure 7:
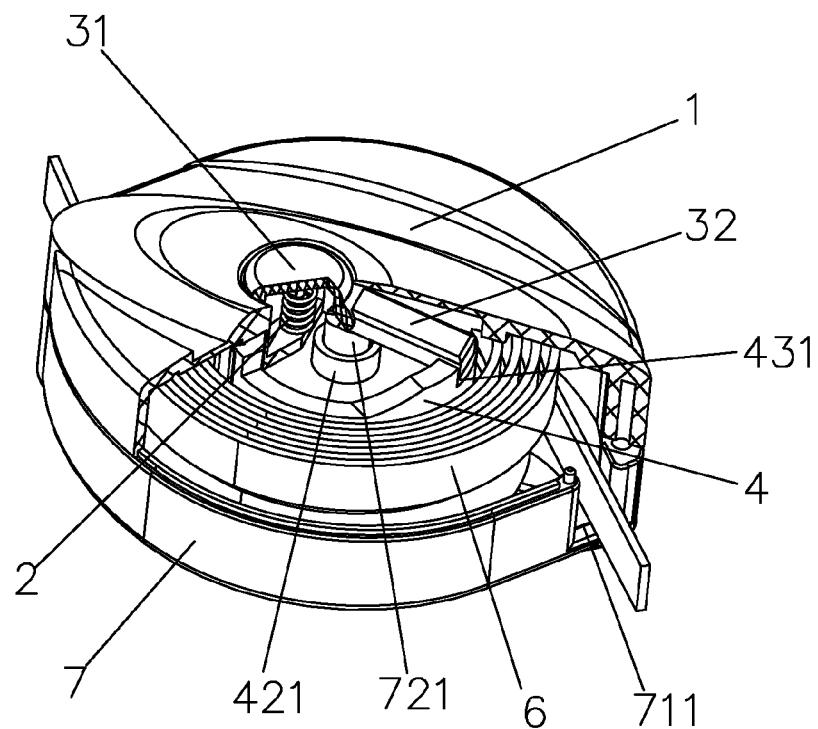
FIG. 7 is a sectional view showing a local part of the present invention.
Figure 8:
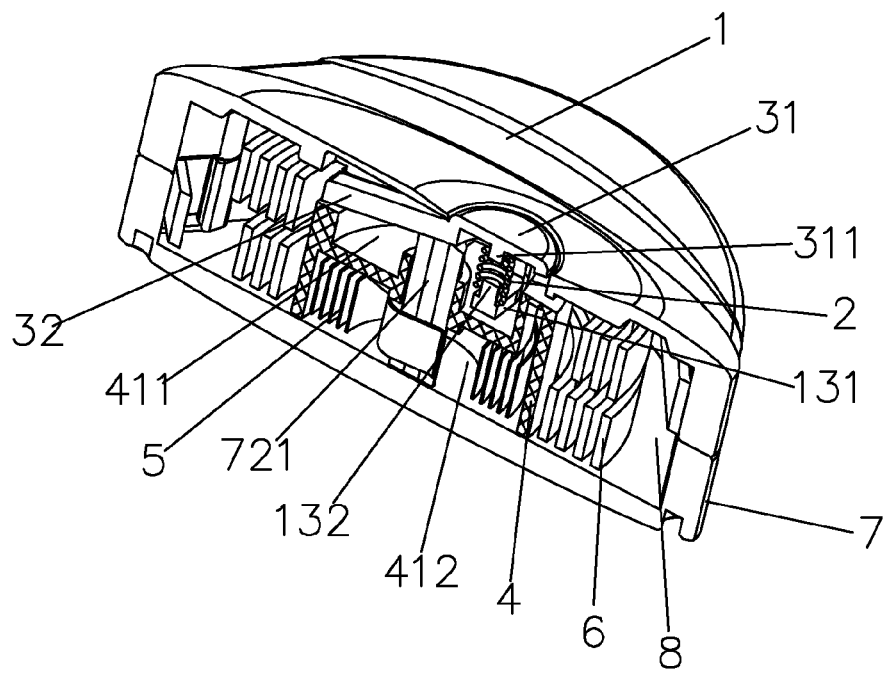
FIG. 8 is a sectional view showing the construction of the present invention.

Referring to FIGS. 2 through 8, a press cord reel box is comprised of an upper casing 1, a press spring 2, a push button 3, a revolving cylinder 4, a wiring material 6, and a lower casing 7. Wherein a push button hole 11 is disposed on a top of the upper casing 1; a U-shaped cantilever 13 protrudes from an inner wall 12 of the upper casing, a primary arm 131 of the cantilever 13 laterally penetrates through the push button hole 11, a locating pillar 132 protrudes from the primary arm 131 in the direction of heading for the push button 11, a slot 121 is disposed on the inner wall 12 of the upper casing 1, and a cord outlet 141 is provided on a sidewall 14 of the upper casing 1.

The press spring 2 is inserted onto the locating pillar 132 of the upper casing.

The push button 3 is comprised of a press portion 31 and a locating portion 32 protruding from the press portion 31; the press portion 31 is inserted into the push button hole 11, a bottom of the press portion 31 compresses a top of the press spring 2 to form an elastic press switch; to better secure the press coil 2 at where below the press portion 3, a locating tenon 311 protrudes from a bottom of the press portion to lock to the spring 2. When pressed downward by the press portion 31, the locating portion 32 is raised when pressed by the press portion 31 to allow it to be received in the slot 121 of the upper casing 1 to reduce a space occupied by the locating portion 32 in the cord reel box.

The revolving cylinder 4 has an accommodation space 41 provided in its center, and a partitioning plate 42 with a central axial hole 421 is laterally disposed in the revolving cylinder 4 to divide the accommodation space 41 into an upper accommodation space 411 and a lower accommodation space 412. The coil 5 is inserted into the lower accommodation space 412; three recesses 431 are disposed on a top of the revolving cylinder 4 to engage and secure the locating portion 32 of the push button 3; one side of an inner wall 432 of each recess 431 indicates a slope; and all inclined inner walls of those three recesses 431 are disposed along their revolving directions to better achieve the purpose of securing the locating portion 32 in place.

The wiring material 6 winds up on a peripheral of the revolving cylinder 4 and has both ends respectively connected to a pair of crystal connector (not illustrated) for connecting the cord reel box to associate equipments including cord distribution box, computer, and hardware facilities.

The lower casing 7 and the upper casing 1 are interlocked to provide an accommodation chamber 8 to house the revolving cylinder 4 and the wiring material 6. Another cord outlet 711 is disposed on a sidewall 71 of lower casing 7. Accordingly, both ends of the cord material 6 are led out along the cord outlet 141 on the upper casing and the cord outlet 711 of the lower casing 7. A turning axle 721 protrudes from an inner wall 72 of the lower casing 7 to penetrate through the coil 5, the central axial hole 421 of the revolving cylinder 4 in sequence, and has a top of the turning axle 721 holding against where below the locating portion 32 of the push button 3.

The working principle of the present invention involves that when an operator presses the press portion 31 of the push button, the press portion 31 compresses the spring 2 on one hand and raises the locating portion 32 using the U-shaped cantilever 13 securing the spring 2 as a support to clear the locating portion 32 out of those recesses 431 provided on the revolving cylinder 4 on the other hand. The locating portion 32 of the preferred embodiment may be received in the slot 121 on the inner wall of the upper casing 1. Meanwhile the revolving cylinder 4 starts to turn around using elastic force supplied by the coil 5 with the turning axle 721 of the lower casing 7 as an axis (related to the prior art) thus to lead out the wiring material 6 winding up on the peripheral of the revolving cylinder 4. On the contrary, when the operator stops applying force on the press portion 31, the spring 2 outwardly extends to push away the press portion for the locating portion on the other end to move downwardly to be locked in those recesses 431 of the revolving cylinder 4 so to realize the locating effects. That is, the wiring material 6 is in a contained status to prevent from being pulled out. Meanwhile, the locating portion 32 also supports the cord reel box at the turning axle 721 of the lower casing 7 to effectively prevent collapse of the push button 3.

Design of the present invention is characterized in that through changed location of a pivot for the push button to press and supporting the push button by the turning axle from the lower casing, the present invention effectively prevents the push button from collapsing after longer period of repeated press; and that the purpose of product quality assurance is achieve; and that a longer service life is provided; furthermore, all structural members are reasonably disposed in the present invention to achieve simple, compact, and smaller sized assembly to provide powerful utility.

The prevent invention provides an improved structure of a press cord reel box, and the application for a utility patent is duly filed accordingly. However, it is to be noted that the preferred embodiments disclosed in the specification and the accompanying drawings are not limiting the present invention; and that any construction, installation, or characteristics that is same or similar to that of the present invention should fall within the scope of the purposes and claims of the present invention.

I claim:

1. A press cord reel box comprising:

an upper casing, provided with a push button hole; a U-shaped cantilever protruding from an inner wall in the upper case, a primary arm of the cantilever laterally penetrating through the push button hole, and a locating pillar being disposed on the primary arm in a direction heading from the push button hole; a press spring connected by insertion to the locating pillar of the upper casing;

a push button comprised of a press portion and a locating portion extending from the press portion, the press portion being inserted in the push button hole, and a bottom of the press portion compressing a top of the press spring;

a revolving cylinder having at its center an accommodation space to contain a coil, and on its top one or a plurality of recess to interlock with the locating portion of the push button;

a wiring material winding up on a peripheral of the revolving cylinder; and a lower casing interlocked with the upper casing to provide an accommodation chamber for placing the revolving cylinder and the wiring material, a cord outlet to retract or expand being each disposed to the sidewall of the upper casing and the outer casing, a turning axle protruding from an inner wall in the lower casing, the turning axle penetrating the coil and the revolving cylinder in sequence, and resting at where below the locating portion of the push button.

2. The press cord reel box as claimed in claim 1, wherein each of those recesses provided on the revolving cylinder has a sidewall indicating a slope.

3. The press cord reel box as claimed in claim 1, wherein a partitioning plate provided with a central axial hole is laterally disposed in the revolving cylinder; the partitioning plate divides the accommodation space into an upper accommodation space and a lower accommodation space, and the coil is received in the lower accommodation space.

4. The press cord reel box as claimed in claim 1, wherein a locating tenon protrudes from a bottom of the press portion of the push button; and the locating tenon is locked to the spring of the push button.

5. The press cord reel box as claimed in claim 1, wherein a slot to accommodate the locating portion of the push button is provided on an inner wall in the upper casing.

* * * * *